May 26, 1925.
A. T. JOHNSON
BATTERY SUPPORT
Filed Feb. 21, 1925
1,539,119
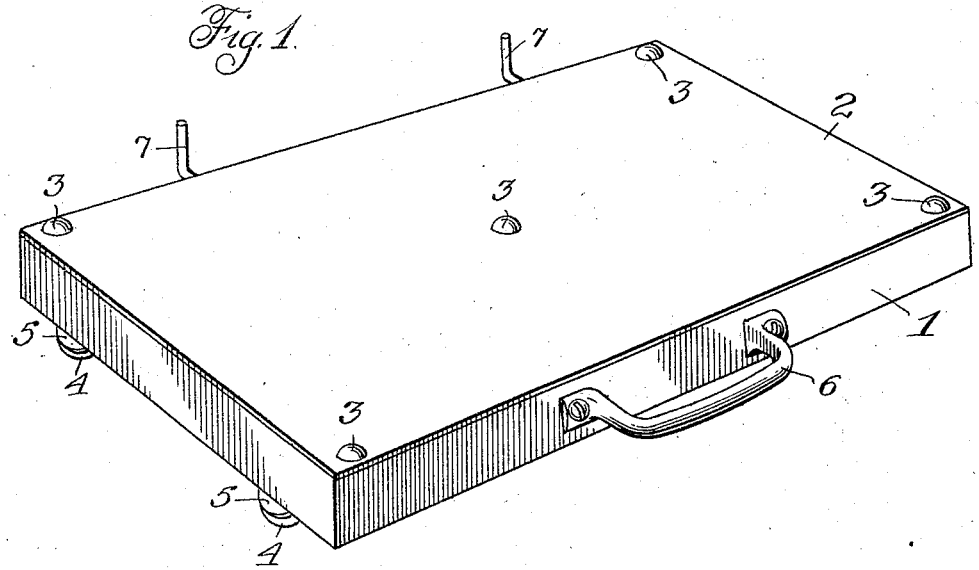
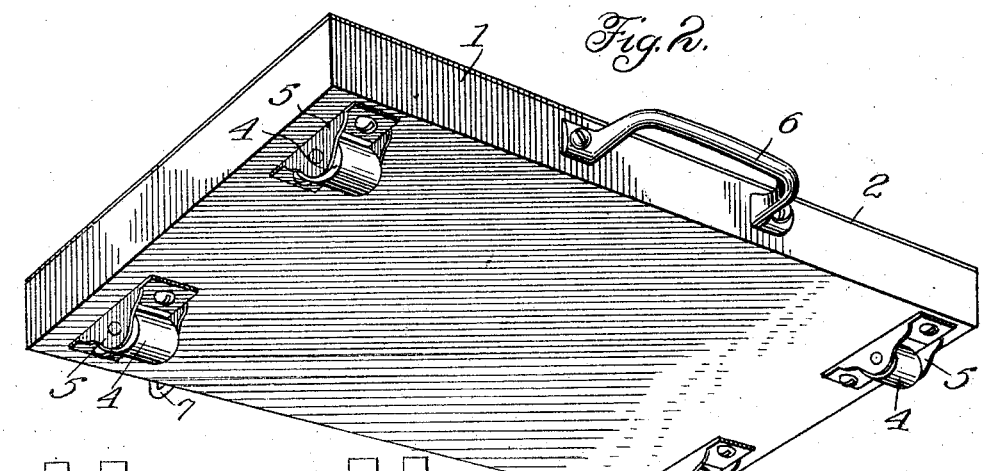
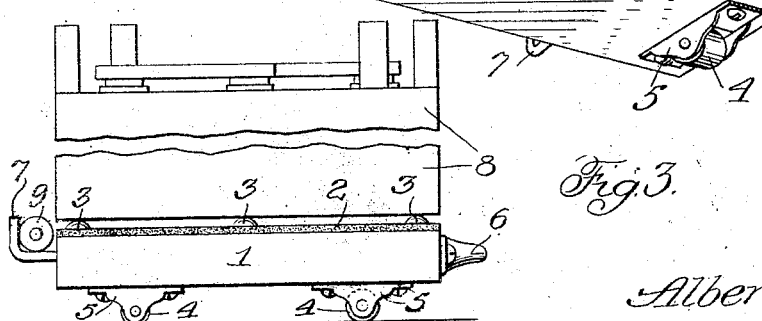
Inventor:
Albert T. Johnson,
By Eugene Cravann
Attorney Patented May 26, 1925.

1,539,119

UNITED STATES PATENT OFFICE.

ALBERT T. JOHNSON, OF CHICAGO, ILLINOIS.

BATTERY SUPPORT.

Application filed February 21, 1925. Serial No. 10,737.

*To all whom it may concern:*

Be it known that I, ALBERT T. JOHNSON, a citizen of the United States, residing at Chicago, in the county of Cook and State of Illinois, have invented new and useful Improvements in Battery Supports, of which the following is a specification.

This invention relates to a support or platform for radio batteries and more particularly for storage or wet batteries.

One object of my invention is to provide the support or platform with a pad of absorbent material, such as blotting paper, to take up any electrolyte or acid spilt or leaking from the battery to prevent injury to the underlying surface on which the support rests.

Another object of my invention is to provide the support or platform with rollers so that the heavy batteries may be readily and easily moved over the floor or table, as the case may be, and thus avoid dragging the batteries over such surfaces to mar or injure them as heretofore.

The invention consists further in the matters hereinafter described and claimed.

In the accompanying drawings:

Figs. 1 and 2 are perspective views of my improved support or platform, Fig. 1 looking at the same from above, and Fig. 2 looking at the same from the under side; and Fig. 3 is an end view of the support with battery thereon.

My improved platform or support comprises a body portion or base member 1 of wood, hard rubber, or other desired material, and of a size or shape to have one or more storage or wet batteries set thereon. As shown in the drawings, the base member 1 is rectangular in shape and of a size to support a single battery, and has a substantially uniform thickness or depth throughout.

The top and bottom surfaces of the base member 1 are preferably horizontally disposed, continuous, unbroken and flat. The top surface is covered by a pad 2 of absorbent material, such as blotting paper. This pad is coextensive with the top surface of the base 1 and is secured thereto in any desired manner. In Figs. 2 and 3, I have shown round-head tacks 3, 3 used for this purpose, with the round heads projecting above the pad to support the battery when placed thereon. This provides an air circulating space between the bottom of the battery and the pad to keep both of the latter normally dry, as shown in Fig. 3. Should any of the electrolyte or acid spill or leak from the battery, it will be absorbed by the pad 2 and thus not run over on the floor or table, as the case may be, to do damage as heretofore.

On the under side of the base 1 are a plurality of rollers 4, 4 in holders 5, 5 secured against the bottom surface of the block, as shown in Fig. 2. These rollers allow for movement of the base 1 with battery or batteries thereon without being dragged over the floor or table to scratch or damage the same, as heretofore. To facilitate moving and carrying the base 1, it has a loop shaped handle 6 on its front edge.

Hooks 7, 7 are at the rear of the block and form a convenient hydrometer support, as shown in Fig. 3. In this figure, the battery is indicated by 8 and the hydrometer by 9. The tacks 3 are arranged one at each of the four corners of the block or base 1 and with the fifth tack in the center of the pad.

I claim as my invention:

1. A battery support, comprising a base member of a size to have a storage battery rest thereon, an absorbent pad covering the upper surface of the base member and secured thereto, rollers carried by the base member on the under side thereof, a handle at the front of the base member, and hooks making a hydrometer rack at the rear of said base member.

2. A battery support, comprising a base member in the form of a rectangular block of a size for a storage battery to rest thereon, said block having a continuous and unbroken flat upper surface, an absorbent pad covering said upper surface, fasteners securing said pad to said block and projecting above said pad, and rollers carried by the block on the under side thereof.

In testimony that I claim the foregoing as my invention, I affix my signature this 19th day of February, 1925.

ALBERT T. JOHNSON.